United States Patent
Fan

[11] 3,856,897
[45] Dec. 24, 1974

[54] PHOSPHORAMIDOTHIOATES
[75] Inventor: Hsing Y. Fan, Modesto, Calif.
[73] Assignee: Shell Oil Company, Houston, Tex.
[22] Filed: May 15, 1972
[21] Appl. No.: 253,031

[52] U.S. Cl.... 260/959, 260/256.5 R, 260/294.8 K, 260/302 F, 260/304, 260/307 G, 260/329 P, 260/345.1, 260/347.2, 260/940, 260/949, 260/951, 260/955, 424/200, 424/202, 424/203, 424/210, 424/216, 424/217, 424/220
[51] Int. Cl............................ A01n 9/36, C07f 9/24
[58] Field of Search............................ 260/955, 959

[56] References Cited
UNITED STATES PATENTS
2,971,020  2/1961  Schrader........................ 260/959 X
3,019,250  1/1962  Kayser et al.................... 260/959 X
3,711,582  1/1973  Schrader et al................. 260/959 X FOREIGN PATENTS OR APPLICATIONS
2,056,176          Germany Primary Examiner—Lorraine A. Weinberger
Assistant Examiner—Richard L. Raymond

[57] ABSTRACT

Phosphoramidothioates of the general formula

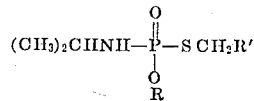

where R is alkyl and R' is an aromatic group such as substituted phenyl, naphthyl, pyridyl, or oxadiazolyl, useful as nematicides, are prepared for example, by reacting an O,O-diakyl isopropylphosphoramidothioate with a compound of the formula R'CH$_2$Cl.

4 Claims, No Drawings

PHOSPHORAMIDOTHIOATES

FIELD OF THE INVENTION

This invention relates to novel phosphoramidothioate derivatives having nematicidal properties, to compositions containing them, and to their use as nematicides.

DESCRIPTION OF THE PRIOR ART

Many phosphoramidothioate derivatives are known. The insecticidal use of certain S-benzyl phosphoramidothioates is disclosed in U.S. Pat. Nos. 2,971,020 and 3,019,250.

Phosphoramidothioates substituted by both an S-aralkyl group and an N-isopropyl group are not known from the literature.

SUMMARY OF THE INVENTION

It has now been found that phosphoramidothioate derivatives substituted by an S-aralkyl group and an N-isopropyl group are nematicidal compounds with outstanding properties.

DESCRIPTION OF THE PREFERRED EMBODIMENTS

The novel compounds of this invention are phosphoramidothioates of the following formula

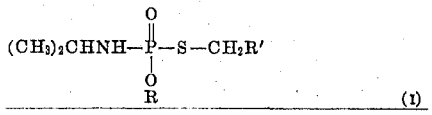

(1)

wherein R is alkyl of one to five carbon atoms, such as methyl, ethyl, propyl, isobutyl, or tert-amyl, and R' is aromatic. By aromatic is intended a ring system which is aromatic in character, i.e., carbocyclic or heterocyclic.

Typical aromatic groups contemplated for use within the scope of this invention are oxadiazolyl, optionally substituted by alkyl of one to six carbon atoms, benzothiazolyl, thienyl optionally substituted by one or more halogens of atomic number 9-35, 5-hydroxy-4-oxo-(4H)-pyranyl, furfuryl, pyrimidinyl optionally substituted by one or more halogens of atomic number 9-35, thiazolyl optionally substituted by one or more halogens of atomic number 9-35, phenyl substituted by one or more of the following groups: halogen of atomic number 9-35 (that is, fluorine, chlorine, or bromine), cyano, alkylthio of one to five carbon atoms, such as methylthio, ethylthio, and propylthio, alkyl of one to five carbon atoms, such as methyl, ethyl, or isopropyl, halomethyl, such as trifluoromethyl, or alkoxy, such as methoxy, ethoxy, or propoxy, and naphthyl or naphthyl substituted by one or more halogens of atomic number 9-35, or pyridyl.

Particularly nematicidally active compounds of this invention are described by Formula I wherein R is methyl or ethyl and R' is naphthyl, chlorophenyl, dichlorophenyl, methylthiophenyl, fluorophenyl, trifluoromethylphenyl, methylchlorophenyl, 5-chloro-2-thienyl, or 2,5-dichloro-3-thienyl, pyridyl, or oxadiazolyl.

In the most preferred class of compounds, having very high nematicidal activity, R' is fluorophenyl, trifluoromethylphenyl, chlorophenyl or dichlorophenyl.

Typical members of this class of nematicides thus include O-ethyl S-(3-methyl-4-(methylthio)benzyl) isopropylphosphoramidothioate O-methyl S-(1-fluoro-2-naphthylmethyl) isopropylphosphoramidothioate O-ethyl S-(4-bromophenyl) isopropylphosphoramidothioate O-methyl S-(1-bromo-2-naphthylmethyl) isopropylphosphoramidothioate.

The phosphoramidothioates of the invention are readily prepared by combining an O,O-dialkyl phosphoramidothioate with an active chlorine-containing compound as in the following reaction:

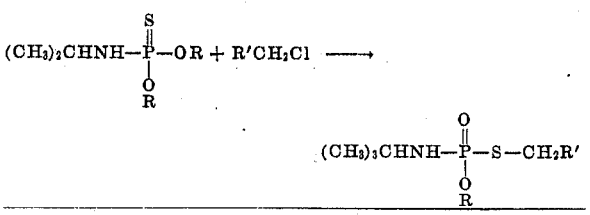

The active chlorine-containing compound contemplated for use in this process is a compound wherein the reactivity of the chlorine is increased by the resonant character of the group to which it is attached. The reaction is carried out at a temperature of from about 100° to about 160° C for a period of about 6 to about 72 hours. The product is isolated by one of the usual methods used by those skilled in the art, for example, by distillation or by recrystallization.

Some of the phosphoramidothioates may be prepared following a reaction procedure similar to that taught in U.S. Pat. No. 3,019,250 wherein an alkali metal salt of an N-alkylthiolophosphoramidic acid is treated with an alkyl halide.

Some of the preferred methods for preparing these compounds are illustrated in the following examples. In the examples below, the structure of all the products was confirmed by elemental and spectroscopic analyses.

EXAMPLE 1

Preparation of O-ethyl S-(2-chlorobenzyl) isopropylphosphoramidothioate

A mixture of 1,622 grams (8 moles) of O,O-diethyl isopropylphosphoramidothioate and 1,417 grams (8.8 moles) of o-chlorobenzyl chloride was heated to 140° C with stirring for 11.5 hours. After cooling, the reaction product was dissolved in 3 liters of boiling hexane and then chilled to yield 2,136 grams of O-ethyl S-(2-chlorobenzyl) isopropylphosphoramidothioate melting at 52°–55° C. Yield: 87 per cent of theoretical.

EXAMPLES 2–16

Using the method of Example 1, the phosphoramidothioates described in Table I were prepared. In Examples 7 and 8, the product was isolated by distillation.

TABLE I

PHOSPHORAMIDOTHIOATES PREPARED from O,O-DIETHYL ISOPROPYL-PHOSPHORAMIDOTHIOATE AND AN ARYLMETHYL CHLORIDE

| Example Number | Phosphoramidothioate | Boiling Point or Melting Point,°C. | Yield, percent |
|---|---|---|---|
| 2 | O-ethyl S-(2,4-dichlorobenzyl) isopropylphosphoramidothioate | 74–75 | 53 |

TABLE 1—Continued

PHOSPHORAMIDOTHIOATES PREPARED from O,O-DIETHYL ISOPROPYL-
PHOSPHORAMIDOTHIOATE AND AN ARYLMETHYL CHLORIDE

| Example Number | Phosphoramidothioate | Boiling Point or Melting Point,°C. | Yield, percent |
|---|---|---|---|
| 3 | O-ethyl S-(4-chlorobenzyl) isopropylphosphoramidothioate | 52–53 | 67 |
| 4 | O-ethyl S-(3,4-dichlorobenzyl) isopropylphosphoramidothioate | 58–59 | 41 |
| 5 | O-ethyl S-(2,6-dichlorobenzyl) isopropylphosphoramidothioate | 104–105 | 50 |
| 6 | O-ethyl S-(naphthylmethyl) isopropylphosphoramidothioate | 64–65 | 16 |
| 7 | O-ethyl S-(4-methylbenzyl) isopropylphosphoramidothioate | 150–152 at 0.05 torr. | 63 |
| 8 | O-ethyl S-(3-chloro-4-methylbenzyl) isopropylphosphoramidothioate | 162 at 0.1 torr. | 56 |
| 9 | O-ethyl S-(3-trifluoromethylbenzyl) isopropylphosphoramidothioate | 40–42 | 40 |
| 10 | O-ethyl S-(2-methylbenzyl) isopropylphosphoramidothioate | 62–63 | 50 |
| 11 | O-ethyl S-(2-fluorobenzyl) isopropylphosphoramidothioate | 48–50 | 34 |
| 12 | O-ethyl S-(3-fluorobenzyl) isopropylphosphoramidothioate | 43–44 | 38 |
| 13 | O-ethyl S-(4-fluorobenzyl) isopropylphosphoramidothioate | 61–62 | 40 |
| 14 | O-ethyl S-((2-chlorothiazol-4-yl)methyl) isopropylphosphoramidothioate | — | 93 |
| 15 | O-ethyl S-((2,5-dichlorothiazol-4-yl)methyl) isopropylphosphoramidothioate | — | 50 |
| 16 | O-ethyl S-(3-(2,5-dichloro)-thenyl) isopropylphosphoramidothioate | 65–66 | 34 |

EXAMPLE 17

Preparation of O-ethyl S-(4-cyanobenzyl) isopropylphosphoramidothioate a. preparation of potassium O-ethyl isopropylphosphoramidothioate To a stirred solution of 105.5 grams (0.5 mole) of O,O-diethyl isopropylphosphoramidothioate in 470 milliliters dimethyl sulfoxide was added portionwise 56 grams (0.5 mole) of potassium tert-butoxide over a period of 2–3 minutes. The reaction mixture was heated on a steam bath for 8 days and then evaporated under high vacuum to remove the solvent and any volatile compounds formed during the reaction. The product was 130 grams of a gummy solid, of which 123 grams was extracted twice with boiling hexane and the residue was dissolved in benzene. The solid which separated on standing was filtered off and the solvent was removed from the filtrate to give 88 grams of a tacky solid to which ethanol was added to give a 50 per cent solution of crude potassium O-ethyl isopropylphosphoramidothioate.

b. Preparation of O-ethyl S-(4-cyanobenzyl) isopropylphosphoramidothioate

A solution of 3.92 grams (0.02 mole) 4-cyanobenzyl bromide and 12 grams of potassium O-ethyl isopropylphosphoramidothioate in 50 milliliters ethanol (prepared above) was heated for 5 hours at 45° C. The reaction mixture was filtered and the filtrate was concentrated to dryness. The residue was mixed with methylene chloride and filtered. The filtrate was again concentrated to dryness to give a liquid residue that partially crystallized on standing. The crystals were filtered and washed several times with ether to give 1.6 grams of colorless, crystalline O-ethyl S-(4-cyanobenzyl) isopropylphosphoramidothioate, melting point 82°–84° C.

EXAMPLES 18–23

Using the method described in Example 17, the phosphoramidothioates described in Table II were prepared. The compounds were prepared in liquid form and purified by chromatography with the exception of compound No. 22 which is a solid.

TABLE II

PHOSPHORAMIDOTHIOATES PREPARED FROM POTASSIUM O-ETHYL ISOPROPYL PHOSPHORAMIDOTHIOATE AND THE CORRESPONDING ARYLMETHYL CHLORIDE

| Example Number | Phosphoramidothioate | Melting Point,°C. | Yield percent |
|---|---|---|---|
| 18 | O-ethyl S-(4-methylthiobenzyl) isopropylphosphoramidothioate | — | 9 |
| 19 | O-ethyl S-(5-chloro-2-thenyl) isopropylphosphoramidothioate | — | 60 |
| 18 | O-ethyl S-(4-methylthiobenzyl) isopropylphosphoramidothioate | — | 9 |

TABLE II—Continued

PHOSPHORAMIDOTHIOATES PREPARED FROM POTASSIUM O-ETHYL ISOPROPYL PHOSPHORAMIDOTHIOATE AND THE CORRESPONDING ARYLMETHYL CHLORIDE

| Example Number | Phosphoramidothioate | Melting Point,°C. | Yield percent |
|---|---|---|---|
| 19 | O-ethyl S-(5-chloro-2-thenyl) isopropylphosphoramidothioate | — | 60 |
| 20 | O-ethyl S-(4-pyridylmethyl) isopropylphosphoramidothioate | — | 36 |
| 21 | O-ethyl S-(benzothiazol-2-yl-methyl) isopropylphosphoramidothioate | — | 30 |
| 22 | O-ethyl S-(4,6-dichloropyrimidin-2-ylmethyl) isopropylphosphoramidothioate | 105 | 35 |
| 23 | O-ethyl S-(1,2,4-oxadiazol-3-yl-methyl) isopropylphosphoramidothioate | — | 90 |

EXAMPLE 24

Preparation of O-methyl S-(4-chlorobenzyl) isopropylphosphoramidothioate a. Preparation of sodium O-methyl isopropylphosphoramidothioate A mixture of 4.6 grams (0.025 mole) of O,O-dimethyl isopropylphosphoramidothioate and 1 gram (0.025 mole) of sodium hydroxide in 50 milliliters ethanol was refluxed for 4 days. The reaction mixture was filtered to remove a small amount of insoluble material and the filtrate was evaporated to dryness to give 4.8 grams of sodium O-methyl isopropylphosphoramidothioate having a melting point of 164°–7° C.

b. Preparation of O-methyl S-(4-chlorobenzyl) isopropylphosphoramidothioate

A solution of 3.2 grams (0.02 mole) of sodium O-methyl isopropylphosphoramidothioate (prepared in a) above) and 3.2 grams (0.02 mole) p-chlorobenzyl chloride in 50 milliliters ethanol was heated to 50° C and held for 7 hours. The reaction mixture was filtered to remove salt, stripped of solvent and diluted with methylene chloride. The solution was filtered to remove an additional small amount of salt and again stripped of solvent. The oily residue was recrystallized from hexane to yield 5.3 grams of colorless O-methyl S-(4-chlorobenzyl) isopropylphosphoramidothioate, melting point 69°–70° C.

Yield: 90 per cent of theoretical.

EXAMPLES 25–56

Using the method of Example 24, the phosphoramidothioates described in Table III were prepared.

TABLE III

PHOSPHORAMIDOTHIOATES PREPARED FROM SODIUM O-METHYL ISOPROPYLPHOSPHORAMIDOTHIOATE AND AN ARYLMETHYL CHLORIDE

| Example Number | Phosphoramidothioate | Melting Point,°C. | Yield, percent |
|---|---|---|---|
| 25 | O-methyl S-(2,4-dichlorobenzyl) isopropylphosphoramidothioate | 80–81 | 83 |
| 26 | O-methyl S-(4-methylbenzyl) isopropylphosphoramidothioate | 38–40 | 76 |
| 27 | O-methyl S-(2-chlorobenzyl) isopropylphosphoramidothioate | 46–48 | 75 |
| 28 | O-methyl S-(3,4-dichlorobenzyl) isopropylphosphoramidothioate | 62–63 | 83 |
| 29 | O-methyl S-(4-methylthiobenzyl) isopropylphosphoramidothioate | 88–91 | 69 |
| 30 | O-methyl S-(1-napthylmethyl) isopropylphosphoramidothioate | 64–65 | 87 |
| 31 | O-methyl S-(4-cyanobenzyl) isopropylphosphoramidothioate | 95–96 | 88 |
| 32 | O-methyl S-(2,6-dichlorobenzyl) isopropylphosphoramidothioate | 100–101 | 76 |
| 33 | O-methyl S-(3-chloro-4-methylbenzyl) isopropylphosphoramidothioate | liquid | 87 |
| 34 | O-methyl S-(4-methoxybenzyl) isopropylphosphoramidothioate | 65–67 | 70 |
| 35 | O-methyl S-(4-fluorobenzyl) isopropylphosphoramidothioate | 49–57 | 44 |
| 36 | O-methyl S-(2-methylbenzyl) isopropylphosphoramidothioate | 54–55 | 67 |
| 37 | O-methyl S-(3-fluorobenzyl) isopropylphosphoramidothioate | 72–73 | 58 |
| 38 | O-methyl S-(2-fluorobenzyl) isopropylphosphoramidothioate | 54–55 | 55 |
| 39 | O-methyl S-(3-trifluoromethylbenzyl) isopropylphosphoramidothioate | 40–41 | 60 |

TABLE III—Continued

PHOSPHORAMIDOTHIOATES PREPARED FROM SODIUM O-METHYL ISOPROPYLPHOSPHORAMIDOTHIOATE AND AN ARYLMETHYL CHLORIDE

| Example Number | Phosphoramidothioate | Melting Point,°C. | Yield, percent |
|---|---|---|---|
| 40 | O-ethyl S-(1,2,4-oxadiazol-3-yl-methyl) isopropylphosphoramidothioate | — | 72 |
| 41 | O-ethyl S-((4,6-dichloro-2-pyrimidinyl)methyl) isopropylphosphoramidothioate | 118–120 | 100 |
| 42 | O-ethyl S-(4-pyridylmethyl) isopropylphosphoramidothioate | 68–71 | 73 |
| 43 | O-ethyl S-(2,5-dichloro-3-thenyl) isopropylphosphoramidothioate | — | 100 |
| 44 | O-ethyl S-(5-chloro-2-thenyl) isopropylphosphoramidothioate | 61–63 | 100 |
| 45 | O-ethyl S-(5-hydroxy-4-oxo-4H-pyran-2-ylmethyl) isopropylphosphoramidothioate | — | 100 |
| 46 | O-methyl S-(1,2,4-oxadiazol-3-ylmethyl) isopropylphosphoramidothioate | — | 100 |
| 47 | O-methyl S-(benzothiazol-2-ylmethyl) isopropylphosphoramidothioate | 79–81 | 68 |
| 48 | O-methyl S-(5-chloro-2-thenyl) isopropylphosphoramidothioate | — | 92 |
| 49 | O-methyl S-(2,5-dichloro-3-thenyl) isopropylphosphoramidothioate | — | 90 |
| 50 | O-methyl S-(4-pyridyl-methyl) isopropylphosphoramidothioate | 64–65 | 38 |
| 51 | O-methyl S-(5-hydroxy-4-oxo-(4H)-pyran-2-yl-methyl) isopropylphosphoramidothioate | 118–119 | 68 |
| 52 | O-methyl S-furfuryl isopropylphosphoramidothioate | — | 80 |
| 53 | O-methyl S-(2-pyridyl-methyl) isopropylphosphoramidothioate | — | 83 |
| 54 | O-methyl S-((5-methyl-1,2,4-oxadiazol-3-yl)methyl) isopropylphosphoramidothioate | — | 87 |
| 55 | O-methyl S-((2-chlorothiazol-4-yl)methyl) isopropylphosphoramidothioate | — | 70 |
| 56 | O-methyl S-((2,5-dichlorothiazol-4-yl)methyl) isopropylphosphoramidothioate | 60–71 | 83 |

The isopropylphosphoramidothioates of this invention have been found to be effective in the protection of plants from the harmful effects of nematodes — that is, unsegmented roundworms of the class Nematoda, also known as eelworms, which customarily inhabit soil and feed upon the roots of plants growing therein. The isopropylphosphoramidothioates are particularly effective against root-knot nematodes of the genus Meloidogyne.

EXAMPLE 57

The isopropylphosphoramidothioates of the invention were thoroughly mixed in varying concentrations with soil infested with the root-knot nematode *Meloidogyne incognita Acrita*. Using standard procedures, the efficacy of the isopropylphosphoramidothioates in controlling root-knot nematodes in tomatoes was determined as compared to an untreated control. Two tests were run; one in which the treated soil was held for 2 weeks before planting the tomato seeds and one in which the soil was held 4 weeks. The dosages used and the per cent control of nematodes obtained at each dosage of each of the test compounds are set out in Table IV.

TABLE IV

PER CENT CONTROL OF ROOT-KNOT NEMATODES

| Compound | Dosage rate, parts per million | | | | | | | |
|---|---|---|---|---|---|---|---|---|
| | 2-Week Hold Time | | | | 4-Week Hold Time | | | |
| | 36 | 9 | 2 | 1 | 36 | 9 | 2 | 1 |
| O-methyl S-(2,4-dichlorobenzyl) isopropylphosphoramidothioate | 100 | 100 | 100 | 86 | 100 | 100 | 96 | 57 |
| O-methyl S-(4-chlorobenzyl) isopropylphosphoramidothioate | 100 | 100 | 100 | 96 | 100 | 100 | 100 | 86 |
| O-methyl S-(4-methylbenzyl) isopropylphosphoramidothioate | 100 | 100 | 64 | 14 | 100 | 82 | 96 | 61 |
| O-methyl S-(2-chlorobenzyl) isopropylphosphoramidothioate | 100 | 100 | 93 | 71 | 100 | 100 | 96 | 57 |
| O-methyl S-(3,4-dichlorobenzyl) isopropylphosphoramidothioate | 100 | 100 | 100 | 86 | 100 | 100 | 89 | 79 |
| O-methyl S-(4-methylthiobenzyl) isopropylphosphoramidothioate | 100 | 100 | 89 | 64 | 100 | 100 | 86 | 50 |
| O-methyl S-(1-naphthylmethyl) isopropylphosphoramidothioate | 100 | 96 | 29 | 14 | 100 | 96 | 21 | 21 |

TABLE IV—Continued

PER CENT CONTROL OF ROOT-KNOT NEMATODES

| Compound | Dosage rate, parts per million | | | | | | | |
|---|---|---|---|---|---|---|---|---|
| | 2-Week Hold Time | | | | 4-Week Hold Time | | | |
| | 36 | 9 | 2 | 1 | 36 | 9 | 2 | 1 |
| O-methyl S-(4-cyanobenzyl) isopropylphosphoramidothioate | 100 | 7 | 0 | 0 | 100 | 29 | 29 | 7 |
| O-methyl S-(2,6-dichlorobenzyl) isopropylphosphoramidothioate | 100 | 100 | 71 | 50 | 100 | 100 | 57 | 14 |
| O-methyl S-(3-chloro-4-methylbenzyl) isopropylphosphoramidothioate | 100 | 100 | 86 | 0 | 100 | 96 | 7 | 7 |
| O-methyl S-(4-methoxybenzyl) isopropylphosphoramidothioate | 100 | 89 | 36 | 0 | 96 | 86 | 0 | 0 |
| O-ethyl S-(2,4-dichlorobenzyl) isopropylphosphoramidothioate | 100 | 100 | 96 | 86 | 100 | 100 | 100 | 89 |
| O-ethyl S-(4-chlorobenzyl) isopropylphosphoramidothioate | 100 | 100 | 100 | 100 | 100 | 100 | 100 | 91 |
| O-ethyl S-(3,4-dichlorobenzyl) isopropylphosphoramidothioate | 100 | 100 | 96 | 83 | 100 | 100 | 100 | 91 |
| O-ethyl S-(2,6-dichlorobenzyl) isopropylphosphoramidothioate | 100 | 100 | 100 | 85 | 100 | 100 | 100 | 85 |
| O-ethyl S-(1-naphthylmethyl) isopropylphosphoramidothioate | 100 | 96 | 70 | 54 | 100 | 100 | 83 | 67 |
| O-ethyl S-(4-cyanobenzyl) isopropylphosphoramidothioate | 100 | 43 | 14 | 0 | 100 | 0 | 0 | 0 |
| O-ethyl S-(4-methylthiobenzyl) isopropylphosphoramidothioate | — | 100 | 93 | 36 | — | 100 | 86 | 50 |
| O-ethyl S-(4-methylbenzyl) isopropylphosphoramidothioate | 100 | 79 | 43 | 29 | 100 | 79 | 14 | 0 |
| O-ethyl S-(3-chloro-4-methylbenzyl) isopropylphosphoramidothioate | 100 | 100 | 43 | 0 | 100 | 100 | 71 | 7 |
| O-ethyl S-(2-chlorobenzyl) isopropylphosphoramidothioate | 100 | 100 | 100 | 100 | 100 | 100 | 100 | 100 |
| O-methyl S-(4-fluorobenzyl) isopropylphosphoramidothioate | — | 100 | 70 | 31 | 100 | 100 | 57 | 7 |
| O-ethyl S-(3-trifluoromethyl)benzyl) isopropylphosphoramidothioate | 100 | 100 | 86 | 57 | 100 | 100 | 96 | 71 |
| O-ethyl S-(4-fluorobenzyl) isopropylphosphoramidothioate | — | — | 100 | 93 | — | — | 100 | 93 |
| O-methyl S-(2-fluorobenzyl) isopropylphosphoramidothioate | — | 100 | 86 | 64 | 100 | 100 | 89 | 36 |
| O-methyl S-(3-(trifluoromethyl)benzyl) isopropylphosphoramidothioate | — | 100 | 86 | 64 | 100 | 100 | 89 | 64 |
| O-methyl S-(3-fluorobenzyl) isopropylphosphoramidothioate | 100 | 100 | 86 | 14 | — | — | — | — |
| O-ethyl S-(2-fluorobenzyl) isopropylphosphoramidothioate | — | 100 | 96 | 86 | — | — | — | — |
| O-ethyl S-(3-fluorobenzyl) isopropylphosphoramidothioate | — | 100 | 86 | 89 | — | — | — | — |
| O-ethyl S-(3-(2,5-dichloro)thenyl) isopropylphosphoramidothioate | 100 | 100 | 71 | 36 | 100 | 100 | 86 | 29 |
| O-ethyl S-(5-chloro-2-thenyl) isopropylphosphoramidothioate | 100 | 100 | 79 | 29 | 100 | 100 | 86 | 50 |
| O-ethyl S-(4-pyridylmethyl) isopropylphosphoramidothioate | 100 | 79 | 7 | 0 | 100 | 86 | 21 | 7 |
| O-ethyl S-(benzothiazol-2-ylmethyl) isopropylphosphoramidothioate | 100 | 50 | 0 | 0 | 100 | 100 | 0 | 7 |
| O-ethyl S-(4,6-dichloropyrimidin-2-ylmethyl) isopropylphosphoramidothioate | 43 | 0 | 0 | 0 | 0 | 0 | 0 | 0 |
| O-ethyl S-(1,2,4-oxadiazol-3-ylmethyl) isopropylphosphoramidothioate | 100 | 86 | 7 | 0 | 100 | 100 | 57 | 0 |
| O-methyl S-(1,2,4-oxadiazol-3-ylmethyl) isopropylphosphoramidothioate | 100 | 86 | 29 | 14 | 100 | 79 | 14 | 8 |
| O-methyl S-(benzothiazol-2-ylmethyl) isopropylphosphoramidothioate | 100 | 93 | 21 | 14 | 100 | 92 | 81 | 81 |
| O-methyl S-(5-chloro-2-thenyl) isopropylphosphoramidothioate | 100 | 100 | 89 | 86 | 100 | 100 | 89 | 86 |
| O-methyl S-(2,5-dichloro-3-thenyl) isopropylphosphoramidothioate | 100 | 100 | 64 | 64 | 100 | 100 | 77 | 54 |
| O-methyl S-(5-hydroxy-4-oxo-(4H)-pyran-2-yl-methyl) isopropylphosphoramidothioate | 0 | 0 | 0 | 0 | 7 | 7 | 7 | 14 |
| O-methyl S-(4-pyridylmethyl) isopropylphosphoramidothioate | 100 | 86 | 0 | 0 | 100 | 86 | 0 | 0 |
| O-methyl S-(2-pyridylmethyl) isopropylphosphoramidothioate | 100 | 100 | 79 | 14 | 100 | 96 | 43 | 0 |
| O-methyl S-(furfuryl) isopropylphosphoramidothioate | 79 | 29 | 0 | 0 | 71 | 7 | 0 | 0 |

The isopropylphosphoramidothioates of this invention may, if desired, be applied as such to the locus to be treated. Ordinarily and preferably, however, these compounds are used in combination with an inert diluent or carrier to make it easier to measure accurately and to apply evenly the small amounts of the nematicide that are required to control nematode activity as well as to apply them in a form that will be readily dispersed through the soil. These compounds can be mixed with or deposited upon inert particulate solids, such as fullers earth, talc, diatomaceous earth, natural clay, kaolin, walnut shell flour, and the like, to form dry particular compositions. Such compositions may be employed as dusts, or they may, if desired, be dispersed in water with or without the aid of a surface-active agent. Alternatively, the dry compositions may be formed into granules or pellets by known techniques.

The isopropylphosphoramidothioates may be dispensed in the form of solutions or dispersions in inert organic solvents or in mixtures of inert organic solvents and water. The solvents that may be used in the preparation of these compositions include both polar and non-polar aliphatic and aromatic solvents including, for example, benzene, toluene, xylene, naphtha, nitrobenzene, dimethylformamide, carbon tetrachloride, acetone, methyl ethyl ketone, ethanol, propanol, butanol, dioxane, and mixtures thereof.

The concentration of the isopropylphosphoramidothioates in the compositions may vary widely and depends upon a number of factors, among the most important of which are the amount of the composition to be applied per unit of area and the particular nematode pest to be controlled.

I claim as my invention:

1. Isopropylphosphoramidothioates of the formula

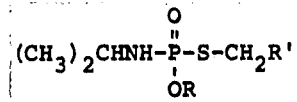

where R is alkyl of one to five carbon atoms; and R' is naphthyl, or phenyl substituted by one or more substituents selected from halogen and alkyl of one to five carbon atoms or by halomethyl.

2. O-ethyl S-(2-chlorobenzyl) isopropylphosphoramidothioate.

3. O-ethyl S-(4-chlorobenzyl) isopropylphosphoramidothioate.

4. O-ethyl S-(2,4-dichlorobenzyl) isopropylphosphoramidothioate.

* * * * *